Nov. 14, 1972     B. O. LINDAHL ET AL     3,702,734
CALIBRATION MEANS FOR INSTRUMENT FOR READING DUST
ACCUMULATIONS ON DARK SLIDES
Filed May 3, 1971     2 Sheets-Sheet 2
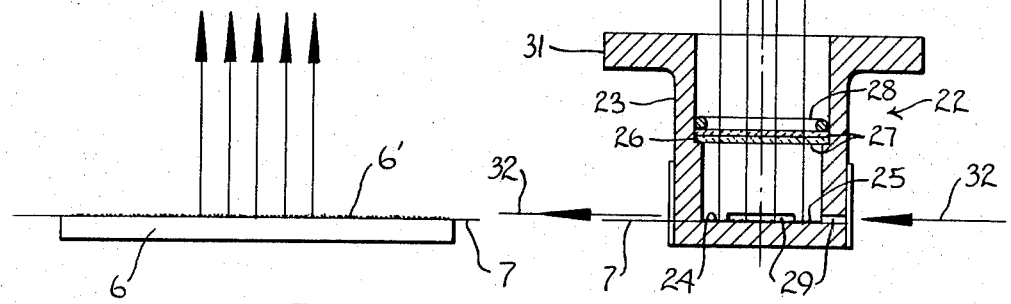
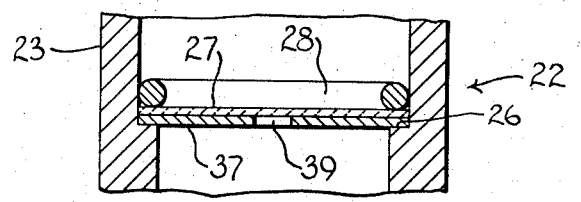
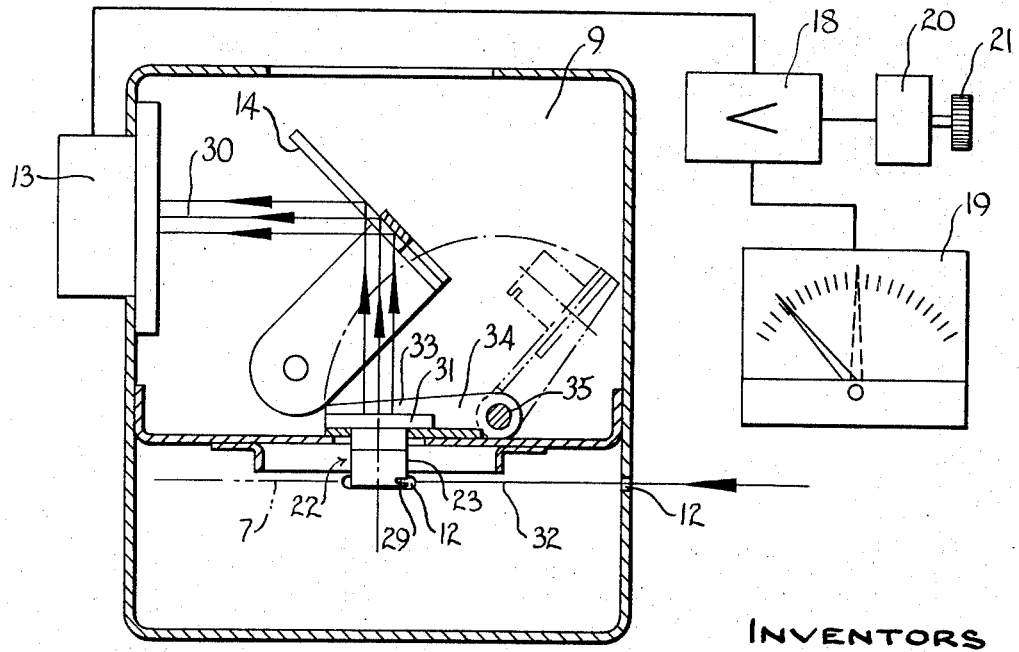
INVENTORS
*Bo Oscar Lindahl*
*Seth Eric Valentin Lamme*
*Sven Josef Harry Hallenrud*
BY *Ira Milton Jones*
ATTORNEY United States Patent Office 3,702,734
Patented Nov. 14, 1972

3,702,734
CALIBRATION MEANS FOR INSTRUMENT FOR READING DUST ACCUMULATIONS ON DARK SLIDES
Bo Oscar Lindahl, Seth Eric Valentin Lamme, and Sven Josef Harry Hallenrud, Jonkoping, Sweden, assignors to Saab-Scania Aktienbolag, Linkoping, Sweden
Filed May 3, 1971, Ser. No. 139,744
Int. Cl. G01n 1/00, 21/00, 21/16
U.S. Cl. 356—38                 4 Claims

ABSTRACT OF THE DISCLOSURE

An instrument for measuring dust accumulation on a dark slide, of the type disclosed in U.S. Pat. No. 3,526,-461, is calibrated before each use with a calibration means mounted in it for movement between a calibrating position at the location to be occupied by slides and an out-of-the-way position. The calibration means comprises means for reflecting toward the photocell of the instrument a portion of the light shone across slides, and pre-calibrated means for controlling the amount of such reflected light that strikes the photocell.

---

This invention relates generally to apparatus for determining the cleanness of air in a controlled environment, and is more specifically concerned with means for calibrating an instrument of the type disclosed in U.S. Pat. No. 3,526,461, to B. O. Lindahl et al.

For measuring the cleanness of air in a so-called clean room in which high precision apparatus is assembled, a slide is exposed in the room for a predetermined period of time, and the dust particles that have been collected on the slide are counted to obtain a quantitative evaluation of the clean room atmosphere. According to the teachings of Pat. No. 3,526,461, the slide has a flat, dark, non-reflecting surface on which dust is collected, and it is read by placing it in a light proof enclosure having non-reflecting interior surfaces. Light is directed across the surface of the slide, parallel thereto, and dust particles on the surface reflect the light in a direction away from the surface, onto a photoresponsive element. Thus the amount of reflected light falling upon the photoresponsive element can be measured to afford a reading of the amount of dust on the slide.

Where the photoresponsive element is a sensitive photoelectric cell that is connected with a meter through an amplifier, an immediate reading can be obtained, since the meter can be calibrated in terms of dust particles per cubic foot of air in the room in which the slide has been exposed. However, the meter reading is not solely a function of the number of dust particles on the slide, but is also influenced by such factors as the intensity of the light, the responsiveness of the photoelectric cell and the amplification factor of the amplifier.

To eliminate from the reading the influences of factors other than dust particle quantity, the meter reading must be corrected for variations in such other factors, which is to say that the instrument must be calibrated.

To a substantial extent the amplifier can be designed and built to be stable, and the intensity of light emission can be stabilized to within relatively narrow limits by energizing the light source through a voltage stabilizer having a feedback from the light source. However, with use and with changes in such environmental conditions as temperature and humidity, there will be at least small changes in the meter reading for a given dust particle count.

Hence, it will be apparent that accuracy requires a primary calibration of the instrument at the time of its manufacture and a secondary calibration from time to time before dust count readings are made. The primary calibration establishes the proper amplification factor for the amplifier, coordinating it with the intensity of light from the light source and normalizing the instrument with other such instruments. The secondary calibration corrects for minor variations that may develop with time and environmental changes.

The general object of the present invention is to provide very simple and convenient means for effecting secondary calibration of a dust slide reading instrument of the above described nature.

Another and more specific object of this invention is to provide a secondary calibration device which is substantially unaffected by any small accumulation of dust thereon, but which is nevertheless at all times located within the measuring chamber of a dust slide reading instrument in which dust collection slides are placed for reading, and is therefore well protected from airborne dust.

Another specific object of this invention is to provide a calibration device for an instrument of the character described that can be installed in the instrument as a component thereof and is sufficiently compact to be readily movable between a calibrating position and an inoperative position so that calibration of the instrument can be performed so quickly and easily as to insure that it will be done routinely.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention as set forth in the appended claims.

The accompanying drawings illustrate two complete examples of embodiments of the invention constructed according to the best modes so far devised for the practical application of the principles thereof, and in which:

FIG. 2 is an edge view of a dust collecting slide to be read by means of the reading instrument, showing the light paths in the instrument in relation to the surface of the slide;

FIG. 3 is a vertical sectional view of the calibration means of this invention;

Figure 1:
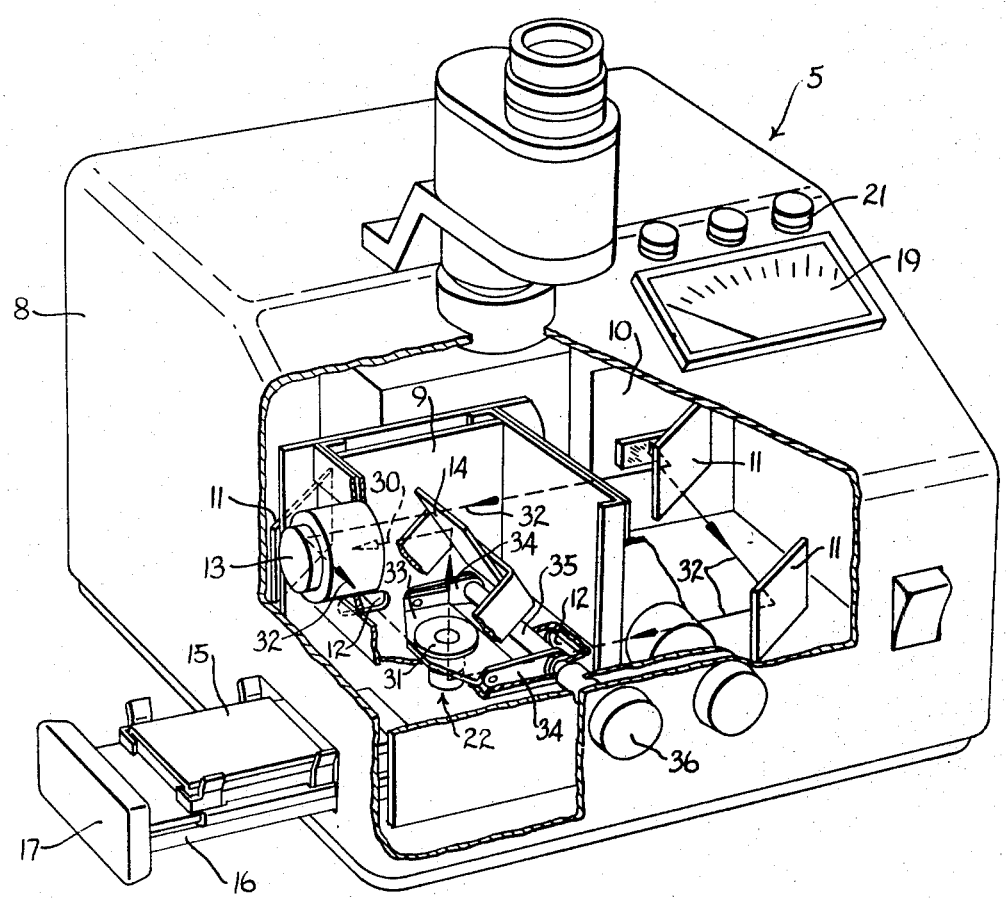
FIG. 1 is a perspective view of a dust slide reading instrument having secondary calibration means embodying the principles of this invention, a portion of the wall of the measuring chamber of the instrument being shown cut away to show details of the invention.

FIG. 4 is a fragmentary view similar to FIG. 3, but on a larger scale, and illustrating a modified form of the calibration means; and FIG. 5 is a vertical sectional view through the measuring chamber of the instrument illustrated in FIG. 1, showing the calibration means in use, together with a diagrammatic illustration of associated elements of the instrument by means of which a calibrated reading is obtained.

Referring now to the accompanying drawings, the numeral 5 designates generally an instrument for reading the number of dust particles that have been collected on a slide 6 during a period of exposure of the slide in a controlled environment enclosure. The slide 6 is a dark slide having a smooth, flat, non-reflecting top surface 6' on which dust particles collect.

The instrument 5 is of the type disclosed in the above mentioned Pat. No. 3,526,461. It comprises, in general, a case or cabinet 8 having partition means 9 in its interior that cooperate with walls of the cabinet to define a measuring chamber with non-reflecting inner surfaces in which a slide to be read is receivable at a predetermined location and in a predetermined position, preferably with its surface 6' horizontal and uppermost and lying in a predetermined plane 7. Also housed in the case or cabinet 8, but outside the measuring chamber, is a light source 10 that cooperates with mirrors 11 to direct a flux of light substantially parallel to the surface 6' of a slide and across the same. The light is admitted to the measuring chamber through horizontally elongated slots 12 in the partition means 9. The mirrors 11 and slots 12 are preferably so arranged that the incident light follows paths 32 that cross the slide from two different directions parallel and adjacent to the plane 7 and at right angles to one another.

A part of the incident light thus entering the measuring chamber is reflected upwardly from the dark surface 6' of the slide by dust particles thereon, and the amount of light so reflected affords an indication of the number of dust particles on the slide. For measuring such reflected light a sensitive photoelectric cell 13 is mounted on one wall of the measuring chamber, facing into the chamber. The photoelectric cell is in the path 30 of light reflected by the dust particles by virtue of the presence of an oblique mirror 14 that is fixed above the slide location and opposite the cell.

Assuming that the reading instrument 5 is located outside the clean room being monitored, the slide 6 is brought to the instrument while enclosed in a cover 15 that prevents additional dust particles from settling onto the surface 6' of the slide while it is in transit. Reference can be made to the copending application of G. R. Eriksson, Ser. No. 778,573, filed Nov. 28, 1968 (which has a common assignee with this application) for details of the cover and the particular drawer-like mechanism 16 in the instrument by which the slide is automatically moved out of the cover while being transferred to its reading position in the measuring chamber and moved back into the cover as it is withdrawn from the chamber.

Since the only aperture in the cabinet 8 is the one through which the drawer-like mechanism 16 carries slides into and out of the measuring chamber, which aperture is normally closed by a panel 17 on that mechanism when the instrument is not in use, the interior of the measuring chamber tends to remain free from dust.

As diagrammatically shown in FIG. 5, the photoelectric cell 13 is connected, through an amplifier 18, with a readout device 19. As illustrated, the readout device is a meter having essentially the same type of mechanism as a conventional voltmeter. It can be calibrated in terms of dust particles per cubic foot. It will be understood, however, that the readout device could comprise, for example, a movable stylus or the like cooperating with a moving chart form to produce a permanent record.

The gain factor of the amplifier 18 is controlled, through a limited range, by means of a potentiometer 20 that has a manually adjustable control 21 accessible at the exterior of the enclosure. The potentiometer control 21 is intended to be adjusted for routine secondary calibration of the instrument.

Primary calibration of the instrument is accomplished as one of the final steps in its manufacture. For this purpose a light reflecting normalizing plate, generally similar to one of the slides 6 but which is not affected by dust and which reflects a known and standardized amount of light, is placed in the position intended to be occupied by slides to be read, with its surface in the plane 7 that will be occupied by the dust collecting surfaces of such slides. With the normalizing plate in place, the gain factor of the amplifier is adjusted, as by the insertion or removal of calibrating resistors, to bring the readout device to a predetermined value $\alpha_p$.

After such primary calibration is accomplished, small changes can occur in the instrument at any time, such as changes in the intensity of light from the light source due to its aging, or slight changes in the gain factor of the amplifier, due to aging or changes in environmental conditions. To compensate for these minor changes, a secondary calibration should always be made before a reading is taken with the instrument. But because the normalizing plate is essentially an item of manufacturing equipment, for standardizing different instruments with one another, each instrument is equipped with a calibration means 22 of this invention, to be used for routine calibration.

The calibration means 22 comprises a small housing 23, preferably tubular or sleeve-like, having at one end thereof a flat interior surface 24 which is provided with a working pattern 25 of reflecting means by which light can be reflected in a direction non-parallel to said surface 24. In use the calibration means is situated at the location in the measuring chamber that is established for slides to be read, and is oriented with its axis vertical and with its surface 24 at its bottom and disposed in the plane 7 that has been established for the surface 6' of the slides. The bore of the tubular housing 23 is of enlarged diameter at its upper end to define an upwardly facing circumferential shoulder 26 that provides a seat for one or more transparent diffuser disks 27, held in place by means of a superimposed resilient snap ring 28.

Adjacent to its bottom surface 24 the housing 23 has slit-like windows 29 that are in the incident light paths 32 and through which light can enter the interior of the housing in beams parallel to said bottom surface. The windows 29 are sealed with transparent material, which can be in the form of a transparent plastic sleeve surrounding the tubular housing, hence dust cannot enter the interior of the housing. All interior surfaces of the housing are of course non-reflecting.

The tubular housing of the calibration means has a radially outwardly projecting circumferential flange or collar 31 at its top by which the housing is secured to a bracket 33. The bracket 33 is in turn supported on a pair of arms 34 which extend radially from a rotatable shaft 35 that projects to the exterior of the housing. A knob 36 on the outer end of the shaft 35 enables the calibration means to be manually swung between an operative calibrating position (shown in solid lines in FIG. 5) and an inoperative position (shown in broken lines). In its calibrating position, as indicated above, the calibrating means has its bottom surface 24 in the position and orientation established for the surface 6' of slides to be read. In its inoperative position the calibrating means is spaced from the slide location and from the paths of incident light from the light source and reflected light from dust particles; hence the calibration means, when in its inoperative position, does not interfere with normal reading of slides. As is evident from the broken line showing in FIG. 5, when the calibration means is in its inoperative position, its bottom surface 24 is partway inverted and is inclined relative to the orientation it has when in its operative position, and hence the slit-like windows 29, and especially the diffuser discs 27, face downwardly so that there is no tendency for these light transmitting surfaces to collect dust that might affect the calibration readings.

Immediately after primary calibration of the instrument has been accomplished, the calibration means 22 is moved into its calibrating position, and it is in effect calibrated by adjusting the quantity of light reflected from its working pattern 25 through the diffuser disk or disks 27. As illustrated in FIG. 3, such adjustment can be effected by introducing or removing diffuser disks 27 as necessary to bring the readout device 19 to substantially a predetermined secondary normal value $\alpha_s$, which is preferably at or near the center of its scale. Alternatively the calibration adjustment can be made as illustrated in FIG. 4, by installing in flatwise superimposed relation to a single diffuser disk 27 an opaque disk 37 having one or more apertures 39 therein, the aperture or apertures being so adjusted as to number and/or size as to bring the readout device to substantially the desired $\alpha_s$ value.

The calibrated $\alpha_s$ value thus obtained is noted on the instrument, or is otherwise so associated therewith as to be readily accessible to an operator. Whenever the instrument is to be used, the calibration means is swung to its calibrating position, and the potentiometer control knob 21 is so adjusted as to bring the readout device 19 to the noted $\alpha_s$ value. This routine calibration then corrects for any changes that may have occurred in the instrument since the time of its manufacture, so that a measuring level coinciding with the primary normal is always obtained when slides are read. Such routine calibration also affords a constant check on the normal functioning of the instrument, inasmuch as abnormalities will be manifested by inability to bring the readout device to its proper $\alpha_s$ value with normal manipulation of the potentiometer knob 21.

It has been found that the light conductivity of the calibration means 22 is extremely constant, inasmuch as dust cannot enter it to cause changes in the reflectivity of the working pattern 25 on its inner bottom surface. Furthermore, any possible small collection of dust on the light outlet aperture at the top of the calibration means has been found to cause no measurable change in the magnitude of reflected light transmitted therethrough. However, as mentioned above, no appreciable accumulation of dust is likely to occur on this light outlet, inasmuch as the calibration means, being located in the measuring chamber, is in a relatively clean environment.

From the foregoing description taken with the accompanying drawings it will be apparent that this invention provides simple, inexpensive and very reliable calibration means for an instrument for measuring dust accumulation on dark slides.

Those skilled in the art will appreciate that the invention can be embodied in forms other than as herein disclosed for purposes of illustration.

We claim:

1. An instrument for measuring the amount of dust that has been collected on a surface of a dark slide, and which instrument comprises means defining a non-reflective lightproof enclosure in which the slide can be established in a predetermined position with said surface thereof in a predetermined plane, means for directing a flux of light along said plane, photoresponsive means spaced from said position for detecting the light that dust particles on said surface reflect away from said plane, and readout means operatively associated with the photoresponsive means, said instrument being characterized by calibration means comprising:
    (A) means defining a housing having
        (1) a flat interior surface,
        (2) a slit-like transparency adjacent to said surface through which a flux of light parallel to said interior surface can enter the housing,
        (3) means on said surface for reflecting a small amount of light in a direction away from said surface,
        (4) transparency means providing a window opposite said interior surface through which a predetermined portion of light reflected from said reflecting means can leave the housing, and
        (5) the other interior surfaces of said housing being nonreflective; and
    (B) means swingably mounting said housing within the enclosure for bodily and rotating movement between a calibrating position in which the housing is in said position with its said flat interor surface on said plane, and an inoperative position in which the housing is spaced to one side of said path and in which its said flat interior surface is at least partially inverted relative to the orientation it has in said calibrating position and said transparency means faces generally downwardly so that dust does not tend to settle upon it.

2. The calibrating means of claim 1, further characterized by:
    said transparency means comprising a diffusing disk.

3. The calibrating means of claim 2 further characterized by:
    said transparency means further comprising an opaque member in flatwise superimposed relation to the diffusing disk and apertured to pass a predetermined amount of reflected light.

4. The calibrating means of claim 1 further characterized by:
    manual actuator means accessible at the exterior of the enclosure and connected with said means mounting the housing, for swinging the housing between its calibrating position and its inoperative position.

References Cited

UNITED STATES PATENTS

| | | | |
|---|---|---|---|
| 3,526,461 | 9/1970 | Lindahl | 356—38 |
| 3,598,492 | 8/1971 | Fruengel | 356—103 |
| 3,234,846 | 2/1966 | Cropper et al. | 356—104 |

RONALD L. WIBERT, Primary Examiner

V. P. McGRAW, Assistant Examiner

U.S. Cl. X.R.

356—103, 207, 244